United States Patent [19]

Adelmann et al.

[11] 4,131,575

[45] Dec. 26, 1978

[54] THERMOPLASTIC POLYCARBONATE MOLDING MATERIALS WITH IMPROVED MOLD RELEASE

[75] Inventors: Siegfried Adelmann; Dieter Margotte; Hugo Vernaleken; Werner Nouverné, all of Krefeld, Germany

[73] Assignee: Bayer Aktiengesellschaft, Leverkusen Bayerwerk, Germany

[21] Appl. No.: 769,725

[22] Filed: Feb. 17, 1977

Related U.S. Application Data

[63] Continuation-in-part of Ser. No. 656,233, Feb. 9, 1976, abandoned.

[30] Foreign Application Priority Data

Feb. 22, 1975 [DE] Fed. Rep. of Germany ....... 2507748
Jan. 18, 1977 [DE] Fed. Rep. of Germany ....... 2701725

[51] Int. Cl.$^2$ .............................................. C08L 69/00
[52] U.S. Cl. ........................... 260/17.4 R; 260/18 TN; 260/31.2 R; 260/31.6; 528/196
[58] Field of Search ............ 260/17.4 R, 18 TN, 31.6, 260/31.2 B

[56] References Cited

U.S. PATENT DOCUMENTS

| | | | |
|---|---|---|---|
| 3,516,957 | 6/1970 | Gray et al. | 260/22 |
| 3,533,994 | 10/1970 | Stewart et al. | 260/45.85 |
| 3,784,595 | 1/1974 | Schirmer et al. | 260/18 TN |
| 3,836,499 | 9/1974 | Schirmer | 260/31.2 R |
| 4,065,436 | 12/1977 | Adelmann et al. | 260/18 TN |

FOREIGN PATENT DOCUMENTS

47-41092 10/1972 Japan.
943280 12/1963 United Kingdom.

OTHER PUBLICATIONS

Polymer Processes, Schildknecht, pp. 685–686 (1956).
Kunlstoff-Handbuch, Band VIII, Section 5.4.3.4f, pp. 151–152 (1973)

Primary Examiner—Stanford M. Levin
Attorney, Agent, or Firm—Gene Harsh; Lawrence S. Pope

[57] ABSTRACT

The present invention is concerned with thermoplastic molding materials of high molecular weight, thermoplastic, aromatic polycarbonates based on aromatic dihydroxy compounds and containing from about 0.01 to 0.1% by weight of esters of saturated aliphatic carboxylic acids with 10 to 20 C atoms and 4-hydric to 6-hydric alcohols.

14 Claims, No Drawings

THERMOPLASTIC POLYCARBONATE MOLDING MATERIALS WITH IMPROVED MOLD RELEASE

This application is a continuation-in-part of our co-pending application Ser. No. 656,233 filed Feb. 9, 1976, now abandoned.

BACKGROUND OF THE INVENTION

The invention relates to thermoplastic molding materials of high molecular weight, thermoplastic, aromatic polycarbonates based on aromatic dihydroxy compounds.

High molecular weight, thermoplastic, aromatic polycarbonates are employed in numerous technical fields of application, because of their typical tough and elastic properties. A disadvantage is their poor mold release when injection-molded, which frequently results in relatively long cycle times. However, for economic and technical reasons, it is desirable to shorten the cycle times as far as possible so as to manufacture larger numbers of moldings per unit time on the injection molding machines. This can be achieved by mold release at higher temperatures. The objective is, therefore, to so modify the polycarbonate melt that the release of the molding from the wall of the mold takes place with low release forces and at high temperatures, without sticking of the solidified melt to the wall of the mold. Easy mold release at high temperatures is in particular also desired in the case of complicated moldings which are molded in molds with parts which cannot be cooled (for example, cross-webs, cores and the like). Undesired sticking of the moldings and damage of the molds on releasing the moldings (breakage of pins and the like), coupled with great losses of time, are frequently the consequence.

In the past, long-chain aliphatic carboxylic acid esters of monohydric and trihydric alcohols have been added to improve the mold release of aromatic polycarbonates, in accordance with DOS (German Published Specification) 2,064,095, DOS (German Published Specification) 2,220,185, U.S. Pat. No. 3,784,595 and U.S. Pat. No. 3,836,499. However, a disadvantage of these mold release agents is the deterioration in mechanical properties on prolonged heat exposure, as a result of which the aromatic polycarbonates which have been modified according to DOS (German Published Specification) 2,064,095, DOS (German Published Specification) 2,220,185, U.S. Pat. No. 3,784,595 and U.S. Pat. No. 3,836,499, so as to give easy mold release no longer satisfy certain technical requirements. A further disadvantage is the ready volatility of the fatty acid esters of glycerol, which particularly manifests itself as a disadvantage at the high temperature at which polycarbonate is processed.

SUMMARY OF THE INVENTION

By means of the present invention, it is possible to provide high molecular weight, thermoplastic, aromatic polycarbonates which show a mold release behavior which is adequate for all technical applications and also show a level of mechanical properties which is, even after prolonged heat exposure, comparable to the corresponding aromatic polycarbonates which do not contain mold release agents. The mold release behavior at higher mold temperatures, whereby the advantages described above are achieved, is particularly desirable.

According to the present invention, there are provided thermoplastic molding materials of high molecular weight, thermoplastic, aromatic polycarbonates based on aromatic dihydroxy compounds containing from about 0.01 – 0.1, preferably from about 0.05 – 0.1, % by weight of an ester of saturated aliphatic carboxylic acids with 10 to 20 C atoms and aliphatic 4-hydric to 6-hydric alcohols.

Alcohols having 4 OH groups are those having preferably between 4 and 16 carbon atoms, most preferably between 4 and 8 carbon atoms; alcohols having 5 OH groups are those having preferably between 5 and 18 carbon atoms, most preferably between 5 and 10 carbon atoms; alcohols having 6 OH groups are those having preferably between 6 and 18 carbon atoms, most preferably between 6 and 12 carbon atoms.

Esters of saturated aliphatic $C_{10}$–$C_{20}$-carboxylic acids and aliphatic alcohols with 4 to 6 OH groups are, according to the invention, those which result from the complete esterification of the 4 to 6 OH groups of the alcohols with one, or more than one, of the $C_{10}$–$C_{20}$-carboxylic acids in question.

The surprising aspect of the invention is that in contrast to the known processes only small amounts of carboxylic acid esters ($<0.1\%$) are required to achieve adequate mold release for all fields of application.

The polycarbonate molding materials according to the invention are distinguished by outstanding ease of mold release, a particular advantage being that the mold release can be effected within a very broad temperature range. As a result, the injection cycles become independent of temperature fluctuations in the injection mold, which is a great advantage for the plastics processor.

The mechanical properties and the long-term use properties of the polycarbonates which have been modified according to the present invention so as to give easy mold release are identical with those of the pure polycarbonates. No deterioration of the mechanical properties and no molecular weight degradation is observed even as a result of prolonged heat exposure (130° C for 300 hours).

Aromatic polycarbonates in the sense of the present invention are to be understood as homopolycarbonates and copolycarbonates which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-hydroxyphenyl)-sulphoxides, bis-(hydroxyphenyl)-sulphones and $\alpha,\alpha$-bis-(hydroxyphenyl)-diisopropyl-benzenes, as well as their nuclear-alkylated and nuclear-halogenated compounds. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846, in German Offenlegungsschriften (German Published Specifications) 1,570,703; 2,063,050; 2,063,052; 2,211,956 and 2,211,957, in French Patent No. 1,561,518 and in the monograph "H. Schnell, Chemistry and Physics of Polycarbonates, Interscience Publishers, New York, 1964".

Preferred bisphenols are those of the formula I

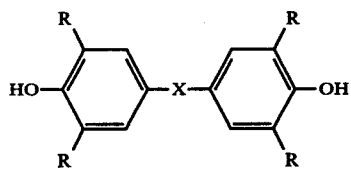

in which
R is identical or different and denotes H, $C_1$-$C_4$-alkyl, Cl or Br
and in which
X is a bond, $C_1$-$C_8$-alkylene, $C_2$-$C_8$-alkylidene, $C_5$-$C_{15}$-cycloalkylene, $C_5$-$C_{15}$-cycloalkylidene, —$SO_2$— or

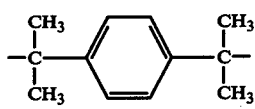

Examples of these bisphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxypenyl)-p-diisopropylbenzene, 2,2-bis-(3,5-dichloro-4-hydroxyphenyl)-propane and 2,2-(3,5-dibromo-4-hydroxyphenyl)-propane.

Examples of particularly preferred bisphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those based on one or more of the bisphenols mentioned as being preferred. Particularly preferred copolycarbonates are those based on 2,2-bis-(4-hydroxyphenyl)-propane and optionally, one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic polycarbonates can be manufactured according to known processes, e.g. in accordance with the melt trans-esterification process from bisphenols and diphenyl carbonate, and in accordance with the two-phase boundary process from bisphenols and phosgene, as described in the above-mentioned literature.

The aromatic polycarbonates can also be branched as a result of the incorporation of small amounts of polyhydroxy compounds, e.g. from about 0.05 – 2.0 mol % based on the bisphenols employed. Polycarbonates of this nature are described, for example, in German Offenlegungsschriften (German Published Specifications) 1,570,533; 1,595,762; 2,116,974 and 2,113,347, British Patent Specification 1,079,821 and U.S. Pat. No. 3,544,514. Some examples of the polyhydroxy compounds which can be used are phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(hydroxyphenyl)-benzene, 1,1,1-tri-(4-hydroxyphenyl)-ethane, tri-(4-hydroxyphenyl)-phenylmethane, 2,2-bis-[4,4-(4,4'-dihydroxydiphenyl)-cyclohexyl]-propane, 2,4-bis-(4-hydroxyphenyl-isopropyl)-phenol, 2,6-bis-(2'-hydroxy-5'-methylbenzyl)-4-methylphenol, 2,4-dihydroxybenzoic acid, 2-(4-hydroxyphenyl)-2-(2,4-dihydroxyphenyl)-propane and 1,4-bis-(4',4''-dihydroxytriphenylmethyl)-benzene.

The aromatic polycarbonates should as a rule have molecular weights $M_w$ of about 10,000 to more than 200,000, preferably of about 20,000 to 80,000.

The esters which are effective according to the present invention are reaction products of 4-hydric to 6-hydric alcohols such as, for example, erythritol, arabitol, adonitol, manitol and dulcitol, and especially mesoerythritol, xylitol, sorbitol and pentaerythritol, with saturated aliphatic carboxylic acids with 10 to 20 C atoms. All aliphatic saturated monocarboxylic acids between capric acid and eicosanoic acid are suitable, optionally together with polycarboxylic acids with 10 to 20 C atoms, for example, capric acid, undecanoic acid, lauric acid, tridecanoic acid, myristic acid, pentadecanoic acid, palmitic acid, margaric acid, stearic acid, monodecanoic acid, eicosanoic acid, sebacic acid, undecanedioic acid, dodecanedioic acid, brassylic acid and thapsic acid.

Suitable carboxylic acids with 10 to 20 C atoms are in particulr myristic acid palmitic acid and stearic acid.

The alcohols can be esterified with either one or several of these carboxylic acids.

Examples of esters to be used according to the invention are pentaerythritol tetrastearate, pentaerythritol tetrapalmitate, pentaerythritol tetramyristate, pentaerythritol tetralaurate, mesoerythritol tetralaurate, mesoerythritol tetrastearate, mesoerythritol tetramargaric acid ester, mesoerythritol tetramyristate, mesoerythritol tetraeicosate, xylitol pentastearate, xylitol pentatridecanoic acid ester, xylitol pentapalmitate, arabitol pentastearate, arabitol pentapalmitate, sorbitol hexastearate, sorbitol hexapentadecanoic acid ester, sorbitol hexapalmitate, dulcitol hexamonodecanoic acid ester, dulcitol hexapalmitate, mannitol hexastearate, mannitol hexamyristate and mannitol hexalaurate.

Single esters of stearic acid and palmitic acid are used preferentially. If the monocarboxylic acids are partially replaced by polycarboxylic acids, higher-molecular carboxylic acid esters are obtained, which are also outstandingly suitable for the mold release of polycarbonates. Equally, mixtures of the esters according to the invention of saturated aliphatic $C_{10}$-$C_{20}$-carboxylic acids and alkanols containing 4 to 6 OH groups are suitable.

The carboxylic acid esters to be used according to the invention are prepared according to customary processes, for example, in accordance with the Einhorn process using pyridine as the acid-binding agent, from alcohol and acid chloride in an inert solvent, or in the melt from the alcohol and acid with or without esterification catalysts such as, for example, p-toluenesulphonic acid. The esterification is carried out at 200 – 250° C. Such processes are described, for example, in "Houben-Weyl, Methoden der organischen Chemie (Methods of Organic Chemistry), Georg Thieme Verlag, Stuttgart, 1952, 4th Edition, Volume VIII, page 516 et seq.

The incorporation of the carboxylic acid esters to be used according to the invention into the high molecular weight, thermoplastic polycarbonates is effected, for example, by applying the substances, which are normally in the form of a powder, onto the granules of the polycarbonate by tumbling and subsequently extruding the material on a twin-screw extruder at 280° C to form a ribbon, which is granulated. However, the mold release agent can also be incorporated during manufacture of the solid polycarbonate. In that case the ester is either admixed, as a solution in a solvent, with the polycarbonate solution before reaching the devolatilization screw, or is metered, without solvent, into the polycarbonate melt.

The addition of the esters to be used according to the invention has no adverse effect on either the transparency or the color of the polycarbonate. Optionally, dyestuffs, pigments, stabilizers, flameproofing agents or fillers such as glass fibers can also be added to the polycarbonate without thereby impairing the effectiveness of the mold release agent.

The thermoplastic polycarbonate molding materials according to the invention are used wherever moldings are manufactured fully automatically, in large numbers and with short cycle times, by the injection molding process. This applies, for example, to the use in the electrical industry and the optical field, for example, for terminal bars, bobbins, complicated housings such as projector housings, floors of switch cabinets and the like, and for particularly complicated moldings which are molded in molds in which there are zones which differ greatly in temperature. When manufacturing such articles, no mold release difficulties are found even at elevated temperatures.

The effectiveness of the esters to be used according to the invention is measured in terms of the mold release forces required for the mold release of injection-molding materials. In the examples which follow, these forces are measured by rendering visible, via an optical and at the same time recording indicator instrument, the pressure which builds up in the hydraulic cylinder of the ejector system during mold release.

The examples which follow are intended to explain the subject of the invention in more detail:

EXAMPLES

I. The aromatic polycarbonates used.

General instructions for the preparation of polycarbonates.

Approx. 454 parts of 4,4'-dihydroxydiphenyl-2,2-propane and 9.5 parts of p-tert.-butylphenol are suspended in 1.5 liter of water. The oxygen is removed from the reaction mixture in a 3-necked flask equipped with a stirrer and gas inlet tube, by passing nitrogen through the reaction mixture for 15 minutes while stirring. 355 parts of 45% strength sodium hydroxide solution and 1,000 parts of methylene chloride are then added. The mixture is cooled to 25° C. While maintaining this temperature by cooling, 237 parts by phosgene are added over a period of 120 minutes. An additional amount of 75 parts of a 45% strength sodium hydroxide solution is added after 15–30 minutes or after the absorption of phosgene has started. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free from salt and alkali. The polycarbonate is isolated from the washed solution and dried. The polycarbonate has a relative viscosity of 1.29 – 1.30, measured in a 0.5% strength solution of methylene chloride at 20° C. This corresponds approximately to a molecular weight of 32,000. The polycarbonate thus obtained is extruded and granulated.

(A.) An aromatic polycarbonate based on 4,4'-dihydroxydiphenylpropane-2,2 (bisphenol A) of relative viscosity $\eta_{rel} = 1.30$, $M_{LS} = 28,000$ ($M_{LS}$ = molecular weight determined by light scattering).

The viscosities are measured at 25° C in methylene chloride, at a concentration of 5 g/l.

(B.) An aromatic polycarbonate based on 90 mol % of bisphenol A and 10 mol % of 4,4'-dihydroxy-3,3',5,5'-tetrabromodiphenylpropane-2,2 (tetrabromobisphenol A) of relative viscosity $\eta_{rel} = 1.33$, $M_{LS} = 37,000$.

C.) An aromatic polycarbonate based on 70 mol % of bisphenol A and 30 mol % of 4,4'-dihydroxy-3,3',5,5'-tetramethyldiphenylpropane-2,2 (tetramethylbisphenol A) of relative viscosity $\eta_{rel} = 1.28$, $M_{LS} = 30.000$.

II. The carboxylic acid esters used.

(D.) Pentaerythritol tetrastearate, melting point 76° C.
(E.) Pentaerythritol tetrapalmitate, melting point 68° C.
(F.) Xylitol pentastearate, melting point 66° C.
(G.) Sorbitol hexapalmitate, melting point 69° C.
(H.) (Comparison example). Triglyceride with acid radicals of palmitic acid, stearic acid and myristic acid in the ratio of 1 : 1 : 0.1, melting point 48° C. (Compare DT-OS (German Published Specification) 2,064,095 and U.S. Pat. No. 3,784,595).

The mold release behavior of the polycarbonates of Examples 1 – 9 is tested on a conical cylinder of 35 mm length and of 40 and 42 mm diameter, and 2 mm wall thickness, by measuring the pressure which builds up in the ejector system. The mold release pressures and temperatures are indicated in Table 1.

Moldings injection-molded from the polycarbonates of Examples 1 – 9 at 270° C hve the properties described in Table 2.

Examples 1, 4 and 6 correspond to polycarbonates A, B and C, respectively, without mold release agent.

EXAMPLE 2

0.1 kg of mold release agent D is applied to 99.9 kg of polycarbonate A by tumbling in a drum at room temperature and the material is then extruded to a ribbon on an extruder at 280° C, and is granulated. The mold release behavior is tested as in Example 1. The properties are described in Tables 1 and 2.

EXAMPLE 3

0.01 kg of mold release agent D is applied to 99.99 kg of polycarbonate A by tumbling in a drum at room temperature and the material is then extruded to a ribbon on an extruder at 280° C, and is granulated. The mold release behavior is tested as described in Example 1. The properties are described in Tables 1 and 2.

EXAMPLE 5

0.1 kg of mold release agent E is applied to 99.9 kg o polycarbonate B by tumbling in a drum at room temperature and the material is then extruded to a ribbon on a extruder at 310° C, and is granulated. The mold release behavior is tested as in Example 1. The properties are described in Tables 1 and 2.

EXAMPLE 7

0.1 kg of mold release agent F is applied to 99.9 kg of polycarbonate C by tumbling in a drum at room temperature and the material is then extruded to a ribbon on an extruder at 300° C, and is granulated. The mold release behavior is tested as in Example 1. The properties are described in Tables 1 and 2.

EXAMPLE 8

0.1 kg of mold release agent G is applied to 99.9 kg of polycarbonate A by tumbling in a drum at room temperature and the materal is then extruded to a ribbon on an extruder at 280° C, and is granulated. The mold release behavior is tested as in Example 1. The properties are described in Tables 1 and 2.

EXAMPLE 9 (Comparison Example)

0.5 kg of mold release agent H is applied to 99.5 kg of polycarbonate A by tumbling in a drum at room temperature and the material is then extruded to a ribbon on an extruder at 280° C, and is granulated. The mold release behavior is tested as in Example 1. The properties are described in Tables 1 and 2.

particularly, those derived from aliphatic dicarboxylic acids.

The suitable polycarboxylic acids, in particular, dicarboxylic acids, are especially those listed above in instant specification.

Besides or instead of the aliphatic $C_{10}$ to $C_{20}$-polycarboxylic acids which can be used according to instant invention, other polycarboxylic acids can be used for the preparation of the esters suitable according to mol invention, i.e., other aliphatic polycarboxylic acids, such as adipic acid, as well as aromatic polycaroboxylic acids, such as trimesic acid.

Esters suitable according to the instant invention which are prepared with the incorporation of aliphatic polycarboxylic acids are, for example, the reaction products from one mol pentaerythritol with 2 mol stearic acid and 1 mol sebacic acid or, for example, from one mol sorbitol with 4 mols monodecanic acid and 1 mol thapsic acid.

The esters suitable according to the invention prepared with the incorporation of polycarboxylic acids should preferably possess average number molecular weights $\overline{M}_n$ of less than 5000, especially, of less than 3000.

The esters suitable according to the instant invention prepared with the incorporation of polycarboxylic

TABLE 1

Mold release behavior of the various polycarbonates

| Example | Composition | | Mold release temperature, ° C | | |
|---|---|---|---|---|---|
| | | | 150° C | 160° C | 170° C |
| 1 | 100% PC A | mold release pressure | 40 bar | 30 bar | 85 bar |
| 2 | 99.9% PC A<br>0.1% mold release agent D | " | 20 " | 10 " | 5 " |
| 3 | 99.99% PC A<br>0.01% mold release agent D | " | 25 " | 20 " | 40 " |
| 4 | 100% PC B | " | 44 " | 36 " | 80 " |
| 5 | 99.9% PC B<br>0.1% mold release agent E | " | 20 " | 10 " | 20 " |
| 6 | 100% PC C | " | 48 " | 35 " | 82 " |
| 7 | 99.9% PC C<br>0.1% mold release agent F | " | 15 " | 10 " | 8 " |
| 8 | 99.9% PC A<br>0.1% mold release agent G | " | 18 " | 8 " | 6 " |
| 9 | 99.5% PC A<br>0.5% mold release agent H | " | 40 " | 15 " | 37 " |

TABLE 2

Moldings injection-molded from the polycarbonates of Examples 1-9 at 270° C have the following properties:

| | Dimension | DIN | 1 | 2 | 3 | 4 | 5 | 6 | 7 | 8 | 9 |
|---|---|---|---|---|---|---|---|---|---|---|---|
| $\eta_{rel}$ | % | | 1.30 | 1.29 | 1.29 | 1.33 | 1.32 | 1.28 | 1.27 | 1.29 | 1.28 |
| elongation at break | % | 53,455 | 120 | 110 | 110 | 100 | 105 | 125 | 120 | 115 | 110 |
| notched impact strength | KJ/m³ | 53,453 | 44 | 43 | 43 | 38 | 40 | 46 | 45 | 42 | 36 |
| Vicat B | ° C | 53,460 | 150 | 150 | 151 | 155 | 153 | 156 | 155 | 150 | 145 |
| elongation at break<br>after heat treatment[x)] | % | 53,455 | 115 | 100 | 115 | 100 | 95 | 120 | 105 | 110 | 60 |
| Vicat B<br>after heat treatment[x)] | ° C | 53,460 | 150 | 148 | 150 | 154 | 153 | 154 | 153 | 148 | 135 |

[x)]the heat treatment was carried out for 300 hours at 130° C in air.

SUPPLEMENTARY DISCLOSURE I

The esters which are effective according to the instant invention are reaction products of 4-hydric to 6-hydric alcohols with saturated aliphatic carboxylic acids with 10 to 20 C-atoms. All aliphatic saturated monocarboxylic acids between capric acid and licosonic acid are suitable, optionally together with polycarboxylic acids with 10 to 20 C-atoms.

Up to 50 carboxyl equivalents of the monocarboxylic acids to be used can be replaced by "carboxyl equivalents" derived from aliphatic polycarboxylic acids and, acids, are obtained as disclosed above in instant specification and are incorporated into the high molecular weight thermoplastic polycarbonates as disclosed above in instant specification and are useful as disclosed above in the instant specification.

SUPPLEMENTARY DISCLOSURE II (Subject of German Patent Application P271725.0(Le A 17,784)). Upon further development, it has now been found that partial esters of the alcohols containing 4 to 6 OH groups are also effective with $C_{10}$–$C_{20}$-carboxylic acids as mold release agents.

Thus, the present invention deals additionally with thermoplastic molding materials of high molecular weight, thermoplastic polycarbonates based on aromatic dihydroxy compounds and containing 0.01 to 0.1% by weight, preferably 0.05 to 0.1% by weight, of a partial ester of saturated aliphatic carboxylic acids with 10 to 20 C-atoms and 4-hydric to 6-hydric alcohols.

The polycarbonate molding materials according to the invention are distinguished by outstanding ease of mold release, a particular advantage being that the mold release can be effected within a very broad temperature range. As a result, the injection cycles become independent of temperature fluctuations in the injection mold, which is a great advantage for the plastics processor.

The mechanical properties and the long-term use properties of the polycArbonates which have been modified according to the present invention so as to give easy mold release are identical with those of the pure polycarbonates. No deterioration of the mechanical properties and no molecular weight degradation is observed even as a result of prolonged heat exposure (130° C for 300 hours).

Aromatic polycarbonates in the sense of the present invention are those defined in instant specification above.

The partial esters of saturated aliphatic carboxylic acids are 10 to 20 C-atoms and 4-hydric to 6-hydric alcohols which are suitable according to the invention are those which are formed by esterification of at least one OH group of the 4-hydric to 6-hydric alcohols, the preferred suitable partial esters being those containing not more than one unesterifiedl OH group.

Of the aliphatic carboxylic acids with 10 to 20 C-atoms mono-$C_{10}$–$C_{20}$-carboxylic acids are those which can above all be used, especially, those listed in instant specification above.

Up to 50 carboxyl equivalents of the mono-carboxylic acids to be used can be replaced by "carboxyl equivalents" derived from aliphatic polycarboxylic acids and, particularly, those derived from aliphatic dicarboxylic acids. Suitable polycarboxylic acids, in particular, dicarboxylic acids, are especially those listed in instant specification above.

Besides or instead of the aliphatic $C_{10}$–$C_{20}$-polycarboxylic acids which can also be used according to the invention, other polycarboxylic acids can be used for the preparation of the partial esters suitable according to the invention, i.e., other aliphatic polycarboxylic acids, such as adipic acids, as well as aromatic polycarboxylic acids, such as trimesic acid.

Suitable 4-hydric to 6-hydric alcohols are, in particular, those mentioned in instant specification above.

Suitable partial esters according to the invention are for example pentaerythritol distearate, pentaerythritol tristearate, pentaerythritol monopalmitate, dipalmitate and tripalmitate, mesoerythritol trilaurate, xylitol distearate, tristearate and tetrastearate, xylitol ditridecanic, xylitol tritidecanic and xylitol tetratridecanic acid esters, sorbitol tristearate, tetrastearate and pentastearate and sorbitol trimonodecanic, sorbitol tetramonodecanic and sorbitol pentamonodecanic acid esters. Mixtures, especially, statistical mixtures of the suitable partial esters accoporading to the invention can also be used.

Partial esters suitable according to the invention, which are prepared with the incorporation of aliphatic polycarboxylic acids are, for example, the reaction products from one mol pentaerythritol with 2.5 mols stearic acid and 0.25 mols sebacic acid or, for example, from one sorbitol with 3 mols monodecanic acid and ½ mol thapsic acid.

The partial esters suitable according to the invention, prepared with the incorporation of polycarboxylic acids should preferably possess average number molecular weights $\overline{M}n$ of less than 5000, especially, of less than 3000.

The carboxylic acid esters to be used according to the invention are prepared according to customary processes, for example, in accordance with the Einhorn process using pyridine as the acid-binding agent, from alcohol and acid chloride in an inert solvent, or in the melt from the alcohol and acid with or without esterification catalysts such as, for example, p-toluenesulphonic acid. The esterification is carried out at 200 – 250° C. Such processes are described, for example, in "Houben-Weyl, Methoden der organischen Chemie (Methods of Organic Chemistry)", Georg Thieme Verlag, Stuttgart, 1952, 4th Edition, Vol. VIII, page 516 et seq.

The incorporation of the carboxylic acid esters to be used according to the invention into the high molecular weight, thermoplastic polycarbonates is effected, for example, by applying the substances which are normally in the form of a powder, onto the granules of the polycarbonate by tumbling and subsequently extruding the material on a twin-screw extruder at 280° C to form a ribbon, which is granulated. However, the mold release agent can also be incorporated during isolation of the solid carbonate. In that case the ester is either admixed, as a solution in a solvent, with the polycarbonate solution before reaching the devolatilization screw, or is metered, without solvent, into the polycarbonate melt.

The addition of the esters to be used according to the invention has no adverse effect on either the transparency or the color of the polycarbonate. Optionally, dyestuffs, pigments, stabilizers, flameproofing agents or fillers such as glass fibers can also be added to the polycarbonate without thereby impairing the effectiveness of the mold release agent.

The thermoplastic polycarbonate molding materials according to the invention are used wherever moldings are manufactured fully automatically, in large numbers and with short cycle times, by the injection molding process. This applies, for example, to the use in the electrical industry and the optical field, for example, for terminal bars, bobbins, complicated housings such as projector housings, floors of switch cabinets and the like, and for particularly complicated moldings which are molded in molds in which there are zones which differ greatly in temperature. When manufacturing such articles, no mold release difficulties are found even at elevated temperatures. The effectiveness of the esters to be used according to the invention is measured in terms of the mold release forces required for the mold release of injection-molding materials. In the examples which follow, these forces are measured by rendering visible, via an optical and at the same time recording indicator instrument, the pressure which builds up in the hydraulic cylinder of the ejector system during mold release.

The examples which follow are intended to explain the subject of the invention in more detail.

EXAMPLES

III. The aromatic polycarbonate used is that listed in instant specification at I,A.

IV. The carboxylic acid esters used.

(B.) Pentaerythritol tristearate, melting point 65-72° C
Preparation:
6.83 kg (24mols) stearic acid are molten in a kettle at approx. 80° C. 1.09 kg (8 mols) pentaerythritol are added while stirring and with a slightly nitrogenous atmosphere. Within 6 hours the mixture is heated up to 220° C. The reaction mixture is kept at 220° C for approx. 20 hours. During this time the water that is separated off is expelled with the nitrogenous stream. The reaction is continued until the acid number remains constant (lower than 5). In order to bring the pentaerythritol stearate into mixable form, the melt is extracted from the kettle via a device which cuts the material into flakes. Melting range approx. 65-72° C, acid number - lower than 5, OH number - 60 (ie. approx. 1.8% OH).

(C.) Esters prepared from one mol pentaerythritol, 2.4 mols stearic acid and 0.3 mols dodecane diacid.

These are prepared in the same way as the pentaerythritol tristearate. Melting range approx. 60 to 65° C; acid number - lower than 5, OH number - 55, (i.e. approx. 1.8% OH).

(D.) (Comparison example) Triglyceride with acid residues of palmitic acid, stearic acid and myristic acid in the ratio of 1 : 1 : 0.1, melting point 48° C (Compare DT-OS (German Published Specification 2 064 095).

The mold release behavior of the polycarbonates of Examples 10-15 is tested on a conical cylinder of 35 mm length and of 40 and 42 mm diameter, and 2 mm wall thickness, by measuring the pressure which builds up in the ejector system. The mold release pressures and temperatures are indicated in Table 3.

Moldings injection-molded from the polycarbonates of Examples 10-15 at 270° C have the properties described in Table 4.

Example 10 corresponds to polycarbonates I, A without mold release agent.

EXAMPLE 11

0.1 kg of mold release agent IV B is applied to 99.9 kg of polycarbonate I, A by tumbling in a drum at room temperature and the material is then extruded to a ribbon on an extruder at 280° C, and is granulated. The mold release behavior is tested as in Example 10. The properties are described in Tables 3 and 4.

EXAMPLE 12

0.1 kg of mold release agent IV C is applied to 99.9 kg of polycarbonate I, A by tumbling in a drum at room temperature and the material is then extruded to a ribbon on an extruder at 280° C, and is granulated. The mold release behaviour is tested as described in Example 10. The properties are described in Tables 3 and 4.

EXAMPLE 13 (Comparison example)

0.1 kg of mold release agent IV D is applied to 99.9 kg of polycarbonate I A by tumbling in a drum at room temperature and the material is then extruded to a ribbon on an extruder at 280° C, and is granulated. The mold release behavior is tested as in Example 10. The properties are described in Tables 3 and 4.

EXAMPLE 14

Preparation according to example 11, the difference being that 0.01 kg mold release agent IV B and 99.99 kg polycarbonate I, A are used.

EXAMPLE 15

Preparation according to example 12, the difference being that 0.01 kg mold release agent IV C and 99.99 kg polycarbonate I, A are used Table 3

Mold release behavior of the various polycarbonates

| Ex. | Composition | | | Mold release temperature ° C | | |
|---|---|---|---|---|---|---|
| | | | | 150° C | 160° C | 170° C |
| | | | | Mold release pressure | | |
| 10 | 100 | % by weight, | I, A | 40 bars | 30 bars | 85 bars |
| 11 | 99.9 | " | I, A | 15 " | 8 " | 6 " |
| | 0.1 | " | IV, B | | | |
| 12 | 99.9 | " | I, A | 20 " | 10 " | 8 " |
| | 0.1 | " | IV, C | | | |
| 13 | 99.9 | " | I, A | 40 " | 25 " | 80 " |
| | 0.1 | " | IV, D | | | |
| 14 | 99.99 | " | I, A | 25 " | 20 " | 40 " |
| | 0.01 | " | IV, B | | | |
| 15 | 99.99 | " | I, A | 40 " | 25 " | 65 " |
| | 0.01 | " | IV, C | | | |

Table 4

Moldings injection-molded from the polycarbonates of Example 10-15 at 270° C have the following properties:

| | Dimension | DIN | 10 | 11 | 12 | 13 | 14 | 15 |
|---|---|---|---|---|---|---|---|---|
| $n_{rel}$ | % | | 1.30 | 1.30 | 1.30 | 1.29 | 1.30 | 1.30 |
| elongation at break | % | 53,455 | 120 | 120 | 120 | 115 | 120 | 120 |
| notched impact strength | $KJ/m^3$ | 53,453 | 44 | 43 | 44 | 40 | 44 | 44 |
| Vicat B | ° C | 53,460 | 150 | 149 | 150 | 146 | 149 | 149 |
| elongation at break after heat treatment+) | % | 53,455 | 115 | 113 | 115 | 80 | 115 | 114 |
| Vicat B after heat treatment+) | ° C | 53,460 | 150 | 147 | 148 | 140 | 149 | 149 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. Thermoplastic molding materials comprising high molecular weight, thermoplastic, aromatic polycarbonates based on aromatic dihydroxy compounds and containing from about 0.01 to 0.1% by weight of esters of saturated aliphatic carboxylic acids with 10 to 20 C atoms and aliphatic 4-hydric to 6-hydric alcohols.

2. Thermoplastic molding materials according to claim 1 containing from about 0.05 to 0.1% of the esters.

3. Thermoplastic molding materials according to claim 1 wherein the esters are of 4 hydric alcohols having between 4 and 16 carbon atoms or of 5-hydric alcohols having between 5 and 18 carbon atoms or of 6-hydric alcohols having between 6 and 18 carbon atoms.

4. Thermoplastic molding materials according to claim 1 wherein the aromatic dihydroxy compounds are those of the general formula (I)

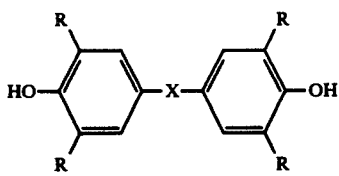

wherein R is identical or different and denotes H, $C_1$–$C_4$-alkyl, Cl or Br and
wherein X is a bond, $C_1$–$C_8$-alkylene, $C_2$–$C_8$-alkylidene, $C_5$–$C_{15}$-cycloalkylene, $C_5$–$C_{15}$-cycloalkylidene, —$SO_2$— or

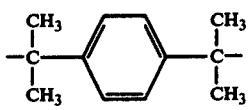

5. Thermoplastic molding compositions according to claim 1 wherein the aromatic polycarbonates include from about 0.05 to 2 mol % by weight, based on the aromatic dihydroxy compounds employed, of polyhydroxy compounds.

6. Thermoplastic molding compositions according to claim 1 wherein the molecular weights of the polycarbonates are from about 20,000 to 80,000.

7. Thermoplastic molding compositions according to claim 1 wherein the saturated aliphatic carboxylic acids are myristic acid, palmitic acid and stearic acid.

8. Thermoplastic molding compositions according to claim 1 containing dyestuffs, pigments, stabilizers, flame proofing agents or fillers.

9. Articles molded from the thermoplastic molding compositions of claim 1.

10. Thermoplastic molding materials according to claim 1, wherein the esters are partial esters of saturated aliphatic carboxylic acids with 10 to 20 C atoms and aliphatic 4-hydric to 6-hydric alcohols.

11. Thermoplastic molding materials according to claim 10 containing from about 0.05 to 0.1% by weight of said partial esters.

12. Thermoplastic molding materials according to claim 10 wherein said partial esters contain not more than 2 unesterified OH-groups.

13. Thermoplastic molding materials according to claim12 wherein said partial esters contain not more than one unesterified OH-group.

14. Thermoplastic molding materials according to claim 10 wherein said partial esters have an average number molecular weight ($M_n$) of less than 5000.

* * * * *

UNITED STATES PATENT AND TRADEMARK OFFICE
CERTIFICATE OF CORRECTION

PATENT NO. : 4,131,575
DATED : December 26, 1978
INVENTOR(S) : SIEGFRIED ADELMANN ET AL It is certified that error appears in the above-identified patent and that said Letters Patent are hereby corrected as shown below:

Title page, column 2, [56] References cited under Other Publications, second line, correct the spelling of "Kunststoff"

Column 1, line 55, correct "temperature" to --temperatures--

Column 2, line 53, insert a half parenthesis in the term "bis-(hydroxyphenyl)" (second occurrence)

Column 4, line 2, correct "(hydroxyphenyl)" to --(4-hydroxyphenyl)--

Column 4, line 30, insert a comma between "myristic acid" and "palmitic acid"

Column 5, line 19, correct "filters" to read --fillers--

Column 6, line 23, "-72$_{rel}$" should read --n$_{rel}$--; same column, line 24, correct "30.000" to --30,000--; same column, line 43, correct the spelling of --have--; same column, "o" at end of line 65 should read --of--; same column, at the end of line 67, "a" should read --an--

In Table 2, bridging columns 7 and 8 the phrase "after heat treatment$^{x)}$" should be located before the closing line following the second recitation of "Vicat B"

UNITED STATES PATENT AND TRADEMARK OFFICE
CERTIFICATE OF CORRECTION

PATENT NO. : 4,131,575

DATED : December 26, 1978

INVENTOR(S) : Siegfried Adelmann et al

It is certified that error appears in the above—identified patent and that said Letters Patent are hereby corrected as shown below:

Column 8, "mol" at end of line 9, should read --instant--; same column, line 11, correct the spelling of --polycarboxylic--; same column line 65, the correct German Patent Application number is "P 27 01 725.0"

Column 9, line 17, correct the printing of --polycarbonates--; same column, line 28, correct "are" to --with--; same column, line 33, correct the spelling of --unesterified--; same column, line 55, correct the spelling of --pentaerythritol-- (second occurrence); same column, line 59, correct the spelling of --tritridecanic--; same column, line 64, correct the spelling of --according--

Column 10, line 2, correct "from one sorbitol" to --from one mol sorbitol--

UNITED STATES PATENT AND TRADEMARK OFFICE
CERTIFICATE OF CORRECTION

PATENT NO. : 4,131,575

DATED : December 26, 1978

INVENTOR(S) : Siegfried Adelmann et al

It is certified that error appears in the above-identified patent and that said Letters Patent are hereby corrected as shown below:

Column 11, line 53, "polycarbonates" should read -- polycarbonate --.

Column 12, line 1, correct the spelling of --behavior--

Column 14, last line, correct "$(M_n)$" to $--(\bar{M}_n)--$

Signed and Sealed this

Sixteenth Day of October 1979

[SEAL]

Attest:

RUTH C. MASON
Attesting Officer

LUTRELLE F. PARKER
Acting Commissioner of Patents and Trademarks